United States Patent
Shor et al.

(10) Patent No.: US 8,028,378 B2
(45) Date of Patent: Oct. 4, 2011

(54) MULTI-SEGMENTED, ARTICULATING CLAMP

(75) Inventors: Richard Shor, Oxnard, CA (US); David Ball, Rancho Palos Verdes, CA (US)

(73) Assignee: Sanisure, Inc., Oxnard, CA (US)

( * ) Notice: Subject to any disclaimer, the term of this patent is extended or adjusted under 35 U.S.C. 154(b) by 351 days.

(21) Appl. No.: 12/315,211

(22) Filed: Dec. 1, 2008

(65) Prior Publication Data

US 2010/0132165 A1 Jun. 3, 2010

(51) Int. Cl.
*F16L 33/00* (2006.01)
(52) U.S. Cl. .......................... 24/19; 24/16 PB; 248/74.4
(58) Field of Classification Search ............... 24/19, 21, 24/284, 282, 279, 16 PB; 248/74.4
See application file for complete search history.

(56) References Cited

U.S. PATENT DOCUMENTS

| | | | |
|---|---|---|---|
| 2,706,648 A | 4/1955 | Gosse | |
| 2,816,343 A | 12/1957 | Decker, Jr. | |
| 3,164,401 A * | 1/1965 | Fawkes | 285/229 |
| 3,359,018 A * | 12/1967 | Simons | 285/367 |
| 3,413,693 A | 12/1968 | Tonnelline | |
| 3,464,722 A | 9/1969 | Larkin | |
| 3,565,468 A * | 2/1971 | Garrett | 285/373 |
| 3,579,754 A * | 5/1971 | Oetiker | 24/279 |
| 3,861,723 A | 1/1975 | Kunz et al. | |
| 4,225,160 A | 9/1980 | Ortloff | |
| 4,371,494 A | 2/1983 | Miller | |
| 4,468,842 A | 9/1984 | Perry et al. | |
| 4,527,818 A * | 7/1985 | Rundell | 285/148.17 |
| 4,779,828 A * | 10/1988 | Munch | 248/74.3 |
| 5,018,768 A * | 5/1991 | Palatchy | 285/24 |
| 5,819,374 A * | 10/1998 | Chiles et al. | 24/16 PB |
| 6,025,561 A | 2/2000 | Dams | |
| 6,405,411 B1 | 6/2002 | Allemann et al. | |
| 6,473,945 B1 * | 11/2002 | Draper | 24/271 |
| 7,107,653 B2 | 9/2006 | Thompson | |
| 7,284,731 B1 * | 10/2007 | Johnson et al. | 248/74.4 |
| 7,338,095 B1 | 3/2008 | Karnes | |
| 7,390,026 B2 | 6/2008 | Noda | |
| 7,418,770 B2 * | 9/2008 | Steingass et al. | 24/16 R |
| 2005/0000062 A1 * | 1/2005 | Lin | 24/279 |
| 2009/0158559 A1 * | 6/2009 | Chardon et al. | 24/16 PB |

* cited by examiner

*Primary Examiner* — Robert Sandy
*Assistant Examiner* — Michael Lee
(74) *Attorney, Agent, or Firm* — Cislo & Thomas, LLP

(57) ABSTRACT

A clamping device, having a plurality of clamp segments, each clamp segment, having an arcuate base, each arcuate base having an interior side and an exterior side, a first pair of sidewalls extruding radially inward from the interior side of the arcuate base, thereby defining an interior channel, wherein the sidewalls are conformable to a fitting inside the interior channel, a second pair of sidewalls extruding radially outward from the exterior side of the arcuate base, thereby defining an exterior channel, wherein each clamp segment is interconnected with at least one other clamp segment by a hinge; and a cable tie to keep the plurality of clamp segments in a closed configuration.

12 Claims, 9 Drawing Sheets

MULTI-SEGMENTED, ARTICULATING CLAMP

BACKGROUND OF THE INVENTION

1. Technical Field

This invention relates to the category of retention clamps used for fittings, such as sanitary fittings. More specifically, it relates to a clamp for positioning and tensioning mating halves of fittings in a conforming way that provides a calibrated compression force and compensates for sanitary fitting deformations produced by non-rigid materials and stress distortions of the fitting dimensions under dynamic load.

2. Background Art

Conventional sanitary fittings were traditionally designed to be made of rigid materials such as stainless steel or glass filled rigid plastics, and held in place by compression clamps also made of rigid metal or rigid plastic clamp assemblies. The common, well-known design consists of two semicircular parts, hingedly connected to each other at a first end and their free ends secured to one another by a threaded stem and nut. Another well-known embodiment utilizes two semicircular sections retained and aligned by an external compression band of plastic or steel about the clamp circumference. An inclined screw hose clamp style closure pulls the opposite ends of a slotted steel band toward one another, reducing the circumference of the band while compressing the object being retained by clamp. A third embodiment commonly known consists of two rigid plastic semicircular halves with a concave external side accommodating a cable tie with predetermined tension markers to approximate cable tension loads. The clamp contains a convex channel profile adapted to accommodate the flange of a sanitary fitting when the fitting halves are disposed inside the clamp in confronting relation to one another.

The primary operating drawback of all such known clamps is that they are designed and constructed of rigid materials for use on rigid material sanitary clamps machined or molded to high precision tolerances. Such clamps require highly symmetrical mating profiles on their contour mating faces between the clamp body and sanitary fitting surfaces. While such precision conditions existed in the traditional sanitary stainless steel market applications, clamping applications now include flexible, single use, disposable sanitary fittings manufactured using non-precision disposable materials. This new class of sanitary fittings represents the predominant market use for high volume, low cost clamping requirements. However, present unique clamping technical requirements and the technical solutions for these unfulfilled needs are not obvious to those trained in the field. Reliable clamping of flexible sanitary fittings is a requirement not met by the prior art, either individually, or taken as a whole at the time the present invention was made.

The primary construction drawback of all known existing clamps is that they are designed and assembled from multiple sub-components, utilizing operating principals that require mechanical construction and assembly while compromising the operating effectiveness of the assembled clamp.

For example, as shown in FIG. 1, a traditional rigid clamp (prior art) with load bearing hinges creates uneven clamping action around a flexible fitting 3. As can be seen at 1 and 2, excessive pressure is created in the main portion of the clamping body away from the hinge and clasp areas, causing the gasket in between the fittings at 1' and 2' to bulge out. This causes leaks in the gasket due to the significant variation in applied pressure both at 3' and 4' due to insufficient clamping pressure, and at 1' and 2' due to gasket protrusion caused by excessive compression and damage to the gasket.

Thus, there is a need for a single-piece, low-cost, flexible clamping device that is adaptable to generate even compression around the new sanitary fittings.

BRIEF SUMMARY OF INVENTION

The present invention is directed to an improved clamping device for flexible sanitary fittings. The improved clamping device comprises a plurality of articulating, conformable clamping segments constructed of a single molded clamping body piece. A cable tie provides inherent "tamper-proof" installation and clamping force. The clamping device is generally circular in shape and converts concentric compression into radial and axial linear closure force on the sanitary fitting body.

Clamping leverage is produced by a central groove under the center of the contact area between the cable tie and flexible clamping segment. This groove concentrates the cable tie's compression force outward from the central groove, compounding the closing force generated by the cable tie.

The clamp segment contour deformation disperses compression force evenly across the surface contact area of the clamping device, compensating for surface irregularities of the sanitary fitting. The clamp segment "molds" into the shape of the fitting profile, producing a consistent surface contact area between the clamping body and sanitary fitting.

Multi-segments of the clamping body adapt to "out of round" and/or inconsistent sanitary fitting profiles, maintaining even clamping force even under dynamic loads. The clamp segments are connected by non-load-bearing flexible hinges, molded as a unitized component during manufacturing.

One-piece clamping body produced of inert material is ideal for high purity, sterile applications where no foreign material can lodge and produce contamination of the fitting.

Cable ties are installed using industry standard, cable tie tensioning gun, with or without calibrated tension.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
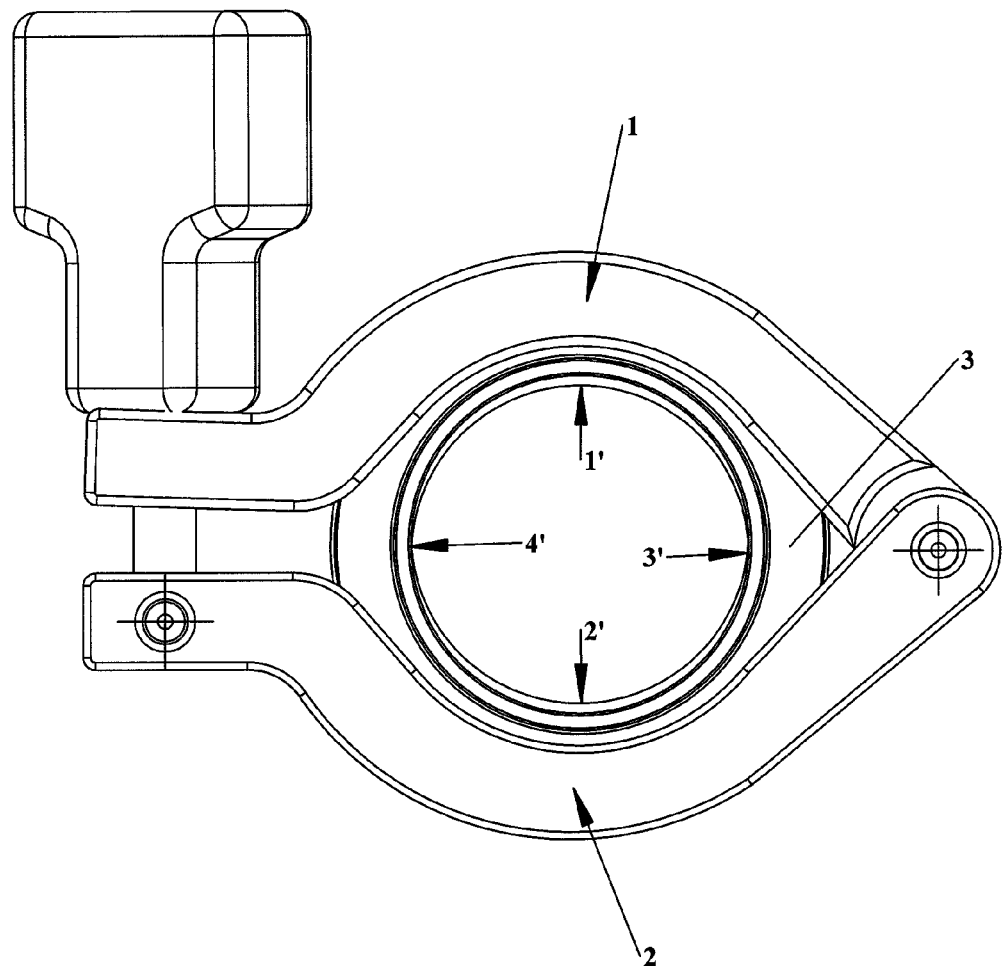
FIG. 1 is a prior art clamp.
Figure 2:
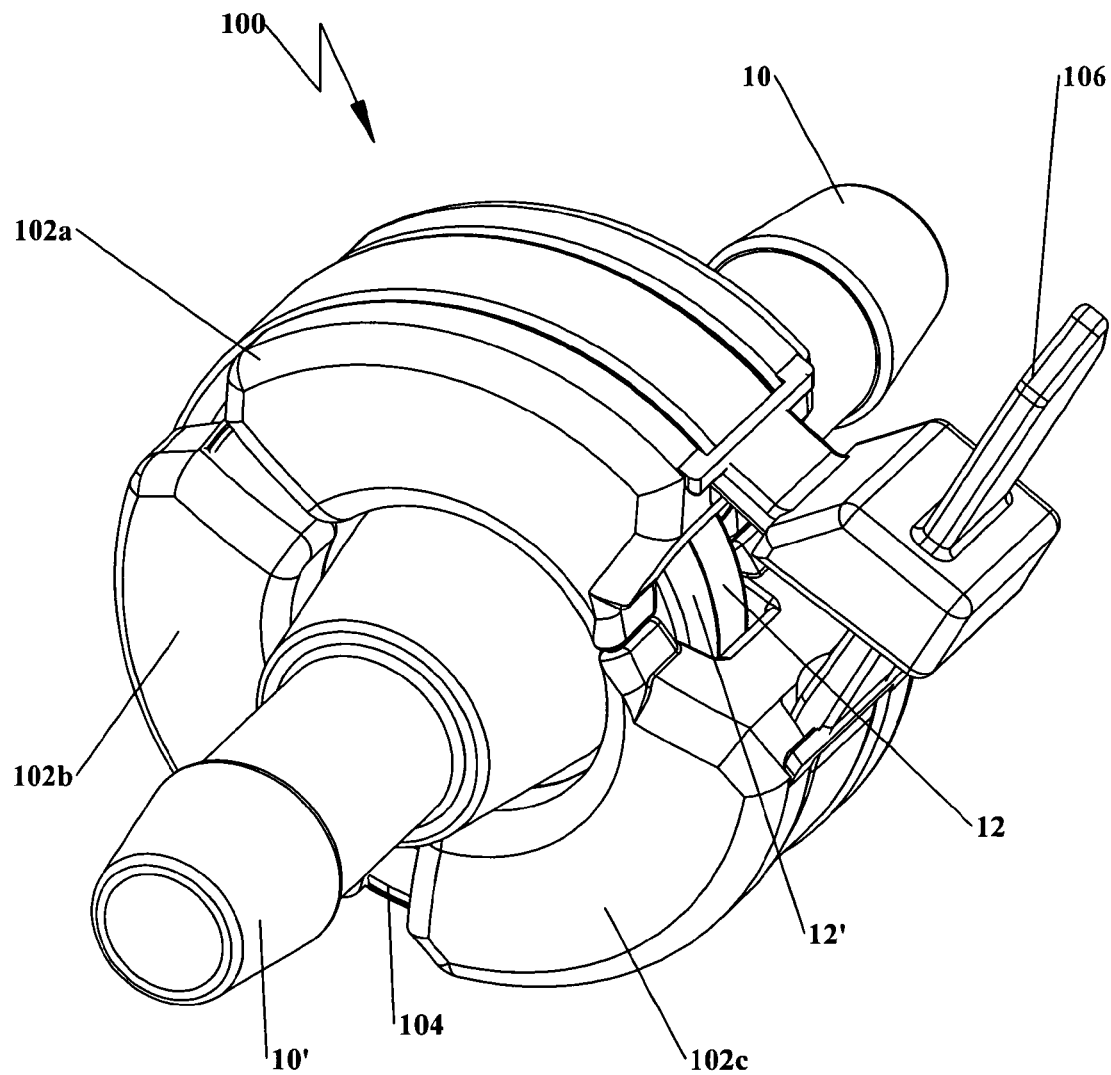
FIG. 2 is a perspective view of an embodiment of the present invention with a fitting.
Figure 3:
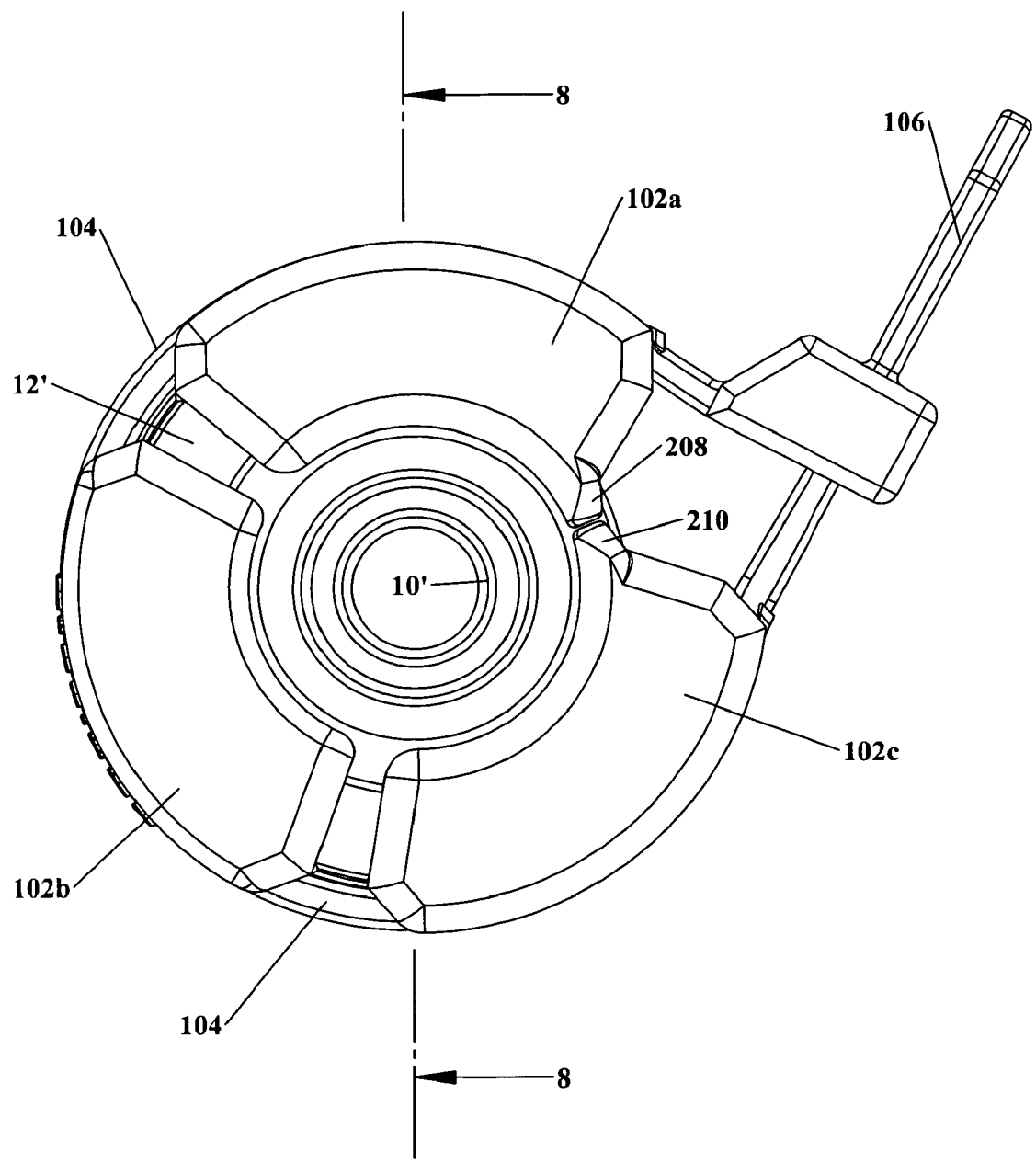
FIG. 3 is a side view of an embodiment of the present invention with a fitting.
Figure 4:
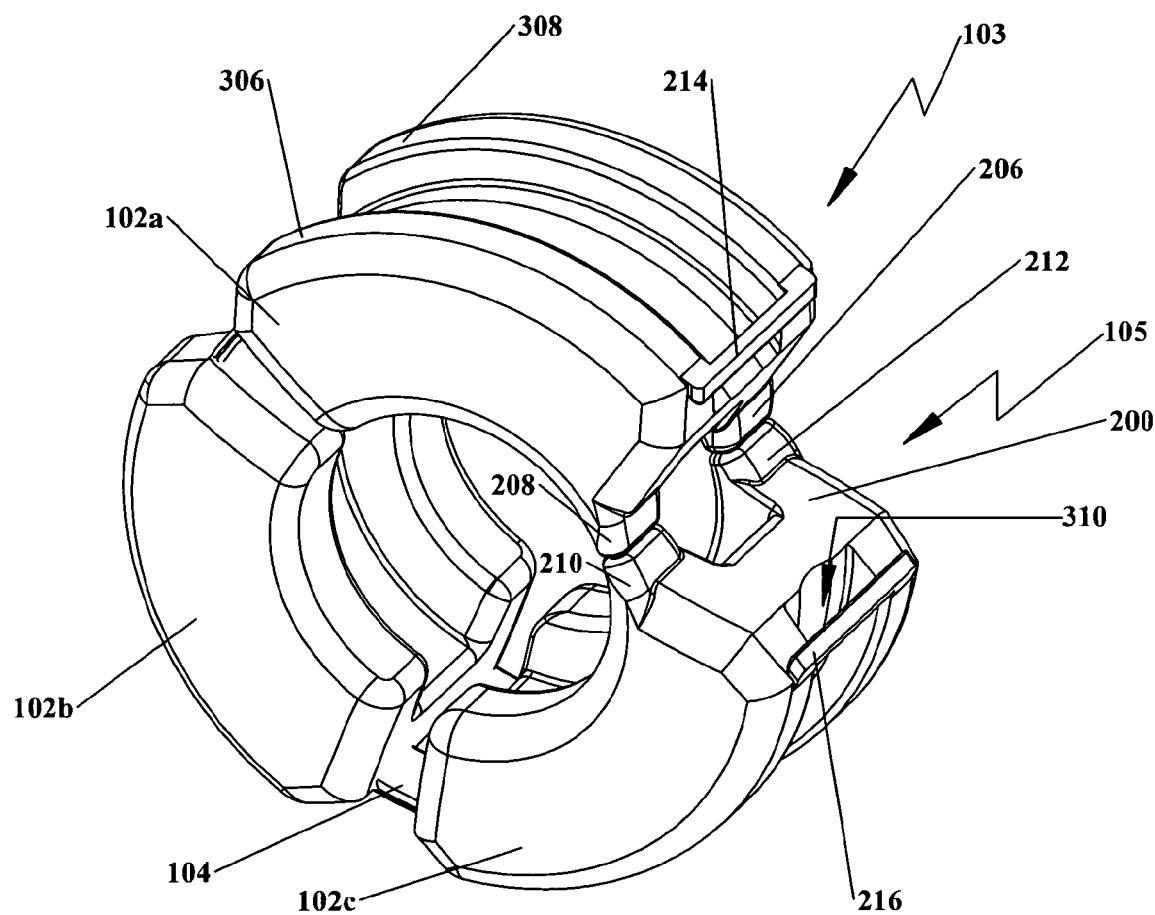
FIG. 4 is a perspective view of an embodiment of the present invention without a fitting or cable tie.

The present invention is an improved clamping device 100 for a pair of cylindrical fittings 10, 10' having flanged mating parts 12, 12'. As shown in FIG. 2, the clamping device 100 is a single component which comprises a plurality of individually functioning clamp segments 102a, 102b, 102c, integrally connected to each other via a plurality of non-load bearing hinges 104; and a cable tie 106 to secure the clamping device 100 around the fittings 10, 10'. A first clamp segment 102a and a last clamp segment 102c comprise a first and second free end 103, 105 of the clamping device 100. In the closed position as shown in FIGS. 2-4, specifically, when the clamping device 100 is wrapped around the fittings 10, 10' with the first and second free ends 103, 105 approaching each other, the clamping device 100 becomes generally circular in shape. The circular compression generates equal pressure distribution around the entire inner surface of the clamp 100 under both static and dynamic load conditions. Although the embodiments shown only have three clamp segments 102a, 102b, 102c, the clamping device 100 of the present invention may have greater or fewer clamp segments.

Figure 6:
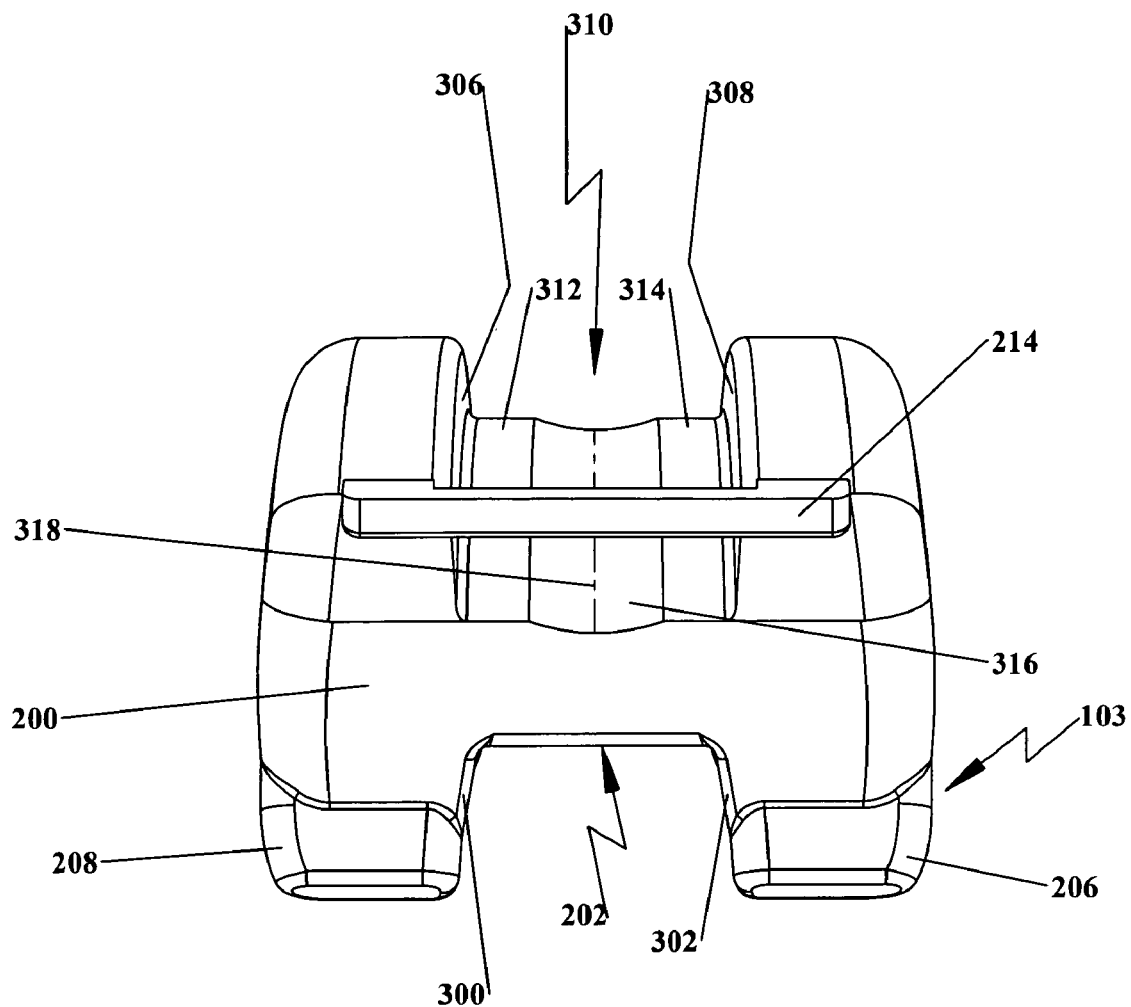
FIG. 6 is a close up front view of a clamp segment.
Figure 7:
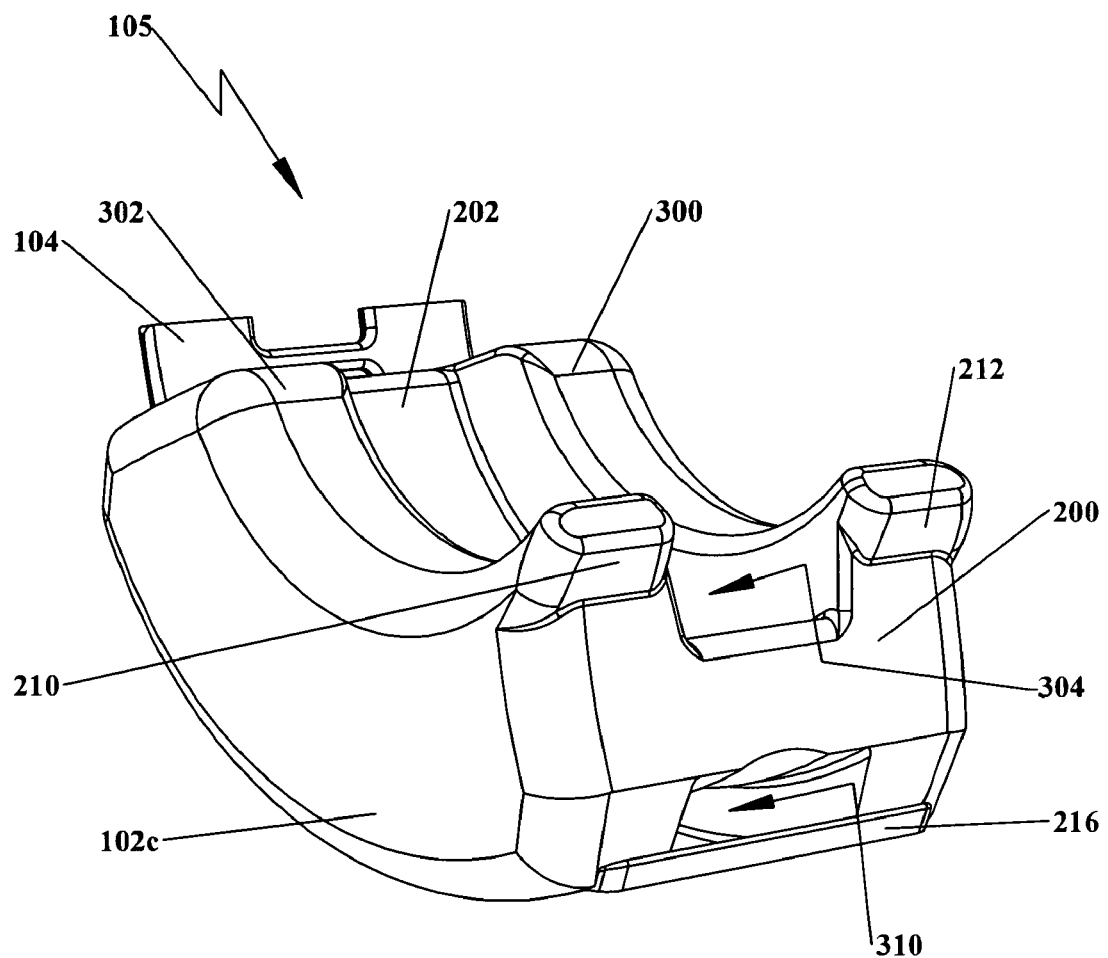
FIG. 7 is a close up perspective view of another clamp segment.

As shown in FIGS. 6 and 7, each clamp segment 102a, 102b, 102c comprises an arcuate base 200 having an interior side 202 and an exterior side 204. The arcuate shape of the base 200 accommodates the overall circular shape when the first and second free ends 103, 105 are brought together to a closed position. The interior side 202 comprises a first pair of sidewalls 300, 302 opposing each other on the interior side 202 and extruding therefrom, thereby defining an internal channel 304 into which the flanged mating parts 12, 12' of the fitting 10, 10' can reside. In some embodiments, the first pair of sidewalls 300, 302 may be parallel to each other. In some embodiments, the first pair of sidewalls 300, 302 may be non-parallel to each other. In a preferred embodiment, the first pair of sidewalls 300, 302 taper toward each other as they approach the interior side 202, thereby forming a tapered internal channel 304.

Due to the tapered nature of the first pair of sidewalls 300, 302 the clamping device 100 not only provides radial compression upon the fittings 10, 10' but also axial compression, thereby providing a dual force compression to fix two adjacent fittings 10, 10' together and to improve the seal between two fittings 10, 10'. In other words, as the clamping device 100 is radially compressed around the fitting, the flanges 12, 12' of the fittings are compressed deeper into the internal or interior channel 304. As the internal or interior channel 304 becomes narrower, the first pair of sidewalls 300, 302 creates an axial force against the flange portions 12, 12' thereby bringing the flanged portions 12, 12' of the fittings 10, 10' closer together and forming a tighter seal.

To further improve the clamping action, the clamp segments 102a, 102b, 102c may be made from a slightly deformable thermoplastic material that can conform to the shape of the flanges. As the clamping segments 102a, 102b, 102c are compressed around a fitting, the first pair of sidewalls 300, 302 bends axially toward each other, thereby providing additional axial pressure upon the flanged portions 12, 12' of the fittings 100. The clamp segment contour deformation disperses compression force evenly across the surface contact area of the clamp profile, compensating for surface irregularities of the clamp or the fitting. The clamp segments 102a, 102b, 102c "mold" into the shape of the fitting profile, producing a consistent surface contact area between the clamp segments 102a, 102b, 102c and sanitary fitting.

Unlike other clamps, which are rigid, this plastic conforming material compensates for shape and surface irregularities of the fittings 10, 10', such as inconsistent wall and gasket thicknesses and other geometric defects, by conforming to those irregularities to maintain even pressure throughout the fitting, thereby reducing stress points created by typical rigid clamp material designs.

The compression force is generated by a cable tie 106 wrapped along the exterior side 204 of the clamp segments 102a, 102b, 102c. The exterior side 204 comprises a second pair of opposing sidewalls 306, 308, extruding therefrom, thereby defining an external groove or channel 310. The exterior groove 310 guides the cable tie 106 and allows for controlled slippage of the cable tie 106 around the clamp segments 102a, 102b, 102c during installation tensioning, thereby equalizing the pressure applied to each clamp segment 102a, 102b, 102c of the clamping device 100. The cable tie 106 provides equal resistance to expansion, and concentrates additional tension to segments 102a, 102b, 102c where additional compression force is required, thereby creating a self-equalizing tension control. The circumferential nature of the cable tie 106 around the clamping device 100 leverages maximum conversion of cable-tie compression forces into a direct linear compression force in a radially inward direction, producing efficient clamping performance with minimal cable-tie compression force. The cable tie 106 may be tightened with the bare hands or with the use of a cable tie gun.

As shown in FIG. 6, the exterior side of each clamp segment may further comprise a pair of lateral ledges 312, 314 within the exterior channel 310 extending the length of the arcuate base 200. The lateral ledges 312, 314 define a central groove 316 having a center line 318 or an axis of symmetry. When the cable tie 106 is positioned inside the exterior channel 310 the cable tie 106 rests on the lateral ledges 312, 314.

Figure 8:
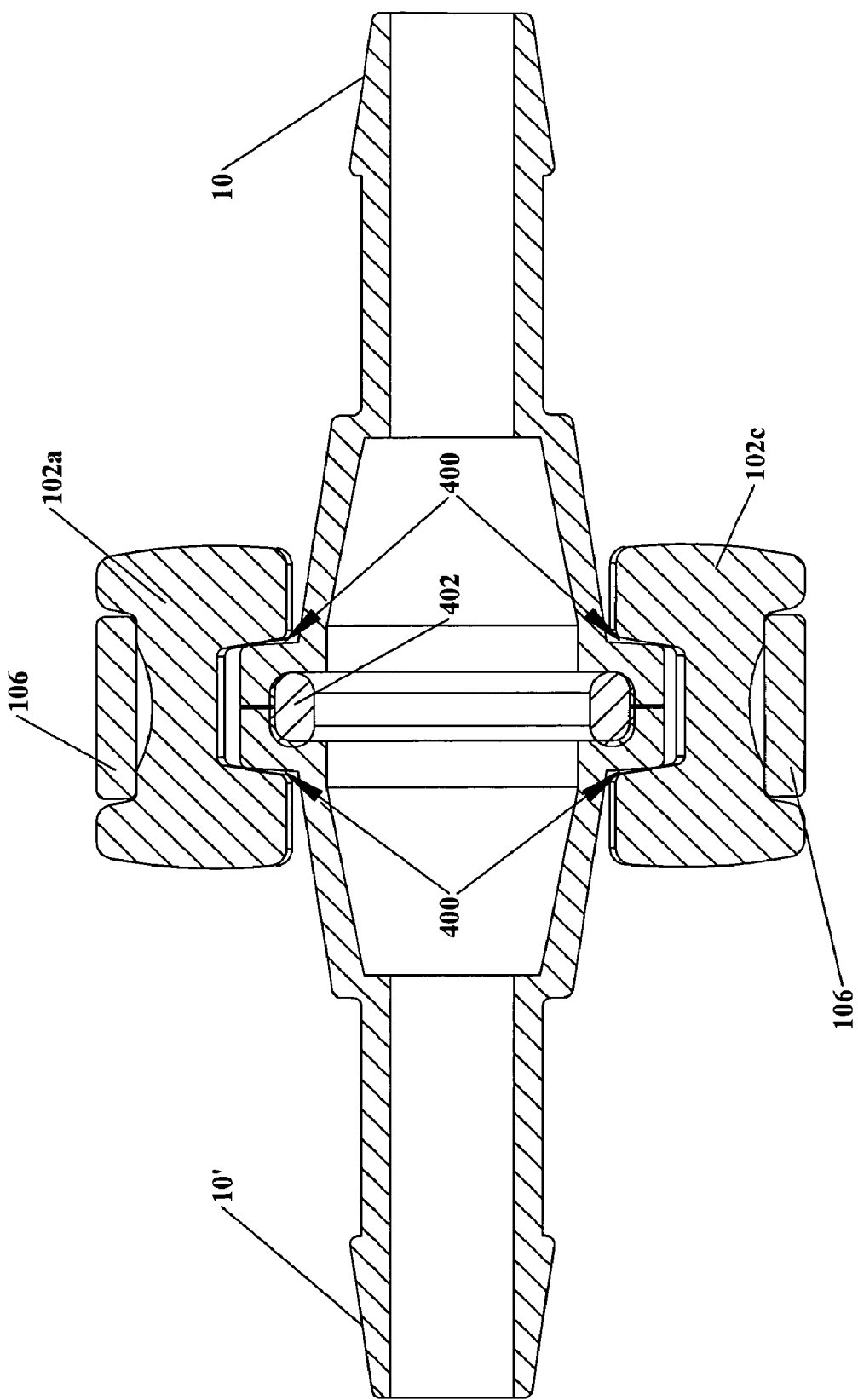
FIG. 8 is a front cross-sectional view taken at 8-8 of the embodiment shown in FIG. 3 in the non-compressed configuration.

FIG. 8 shows a cross-section of the clamping device 100, in the non-compressed configuration, around a pair of fittings 10, 10' having a gasket 402 therebetween. In the non-compressed or untightened configuration, the first pair of sidewalls 300, 302 appears tapered with a gap 400 forming between the first pair of sidewalls 300, 302 and the flanges 12, 12' of the fittings 10, 10'. Clamping leverage is produced by the central groove 316 under the cable tie 106 and flexible arcuate base 200. This central groove 316 concentrates the cable tie's compression force outward from the center of the groove 316, compounding the closing force.

Figure 9:
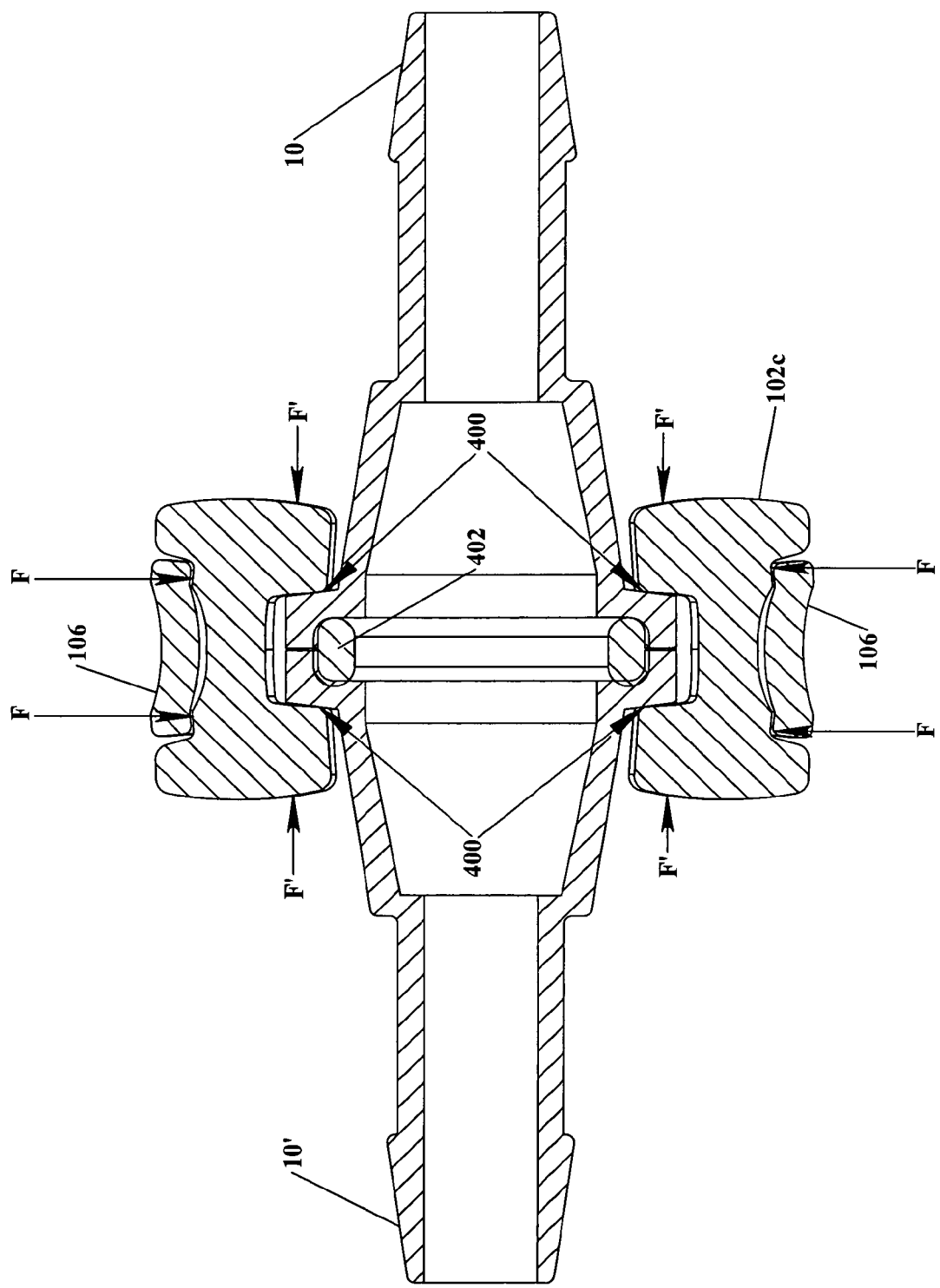
FIG. 9 is a front cross-sectional view of the embodiment shown in FIG. 8 in the compressed configuration.

As shown in FIG. 9, tightening the cable tie 310 increases the radially inward force F on the lateral ledges 312, 314. Due to the material used to manufacture the clamping device 100, this force F upon the lateral ledges 312, 314 causes the arcuate base 200 to bend about the center line 318 or axis of symmetry radially inward. This in turn causes the first pair of sidewalls 300, 302 to bend or flex axially inward. Thus, the first pair of sidewalls 300, 302 being tapered in the natural state, becomes more parallel to each other as the gap disappears as shown at 400'. This generates the axial force F' on the flanges of the fitting, thereby providing a more uniform clamping action relative to traditional clamps. Due to the even nature of the clamping force F' around the circumference of the flanges, the gasket 402 remains intact and uniform.

In some embodiments, the first and last clamp segments 102a, 102c each comprise a protuberance 206, 208, 210, 212 at their free ends 103, 105. The protuberances 206, 208 on the first clamp segment 102a are opposing pairs with the protuberances of 210, 212 on the last clamp segment 102c when the free ends 103, 105 are sufficiently close to one another in the closed position. The protuberances 206, 208, 210, 212 act as positive stops to prevent over-tightening of the clamping device 100.

In some embodiments, the first and last clamp segments 102a, 102c each further comprises a cable guard 214, 216 at their respective free ends 103, 105, across the second pair of side walls 306, 308, over the exterior channel 310. The cable guards 214, 216 facilitate securement of the cable tie 106 by preventing the cable tie 106 from falling out of the exterior channel 310. The cable tie 106 is passed through the exterior channel 310 and underneath the cable guards 214, 216 at both free ends 103, 105 so as to be trapped in the exterior channel 310. The user is now free to secure the clamping device 100 around a fitting 10, 10' without worrying about the cable tie 106 falling off the clamping device 100.

The hinges 104 play an important role in the versatility and efficiency of the clamping device 100. The hinges 104 are integrally connected to the clamping segments 102a, 102b, 102c. Therefore, the entire clamping device 100, except for the cable tie 106 is actually a single piece. The single-piece clamping device 100 can be manufactured in an efficient and cost-effective manner using injection molding, among other techniques. A single-piece clamping device made of inert material is also ideal for high purity, sterile applications where no foreign material can lodge and produce contamination of the fitting.

Creating the clamping device 100 as a single piece not only saves cost and improves operation, but also makes the clamping process easier to perform by a single user. The user can easily slide the cable tie 106 into the exterior channel 310 and insert the cable tie 106 through the cable guards 214, 216. With one hand the user can wrap the clamping device 100 onto a fitting 10, 10' and secure the cable tie 106 with the other hand. Since the flexible hinges only allow major flexation around the Z axis, the clamping segments 102a, 102b, 102c maintain a grossly fixed position relative to each other so as to be evenly distributed around the fitting 10, 10'.

Another advantage of the hinges 104 is that they are non-load bearing hinges due to the cable tie 106 compression. In other words, once the clamping device 100 is clamped onto the fitting 10, 10', even if the hinges 104 were compromised, the compression force would remain.

Figure 5:
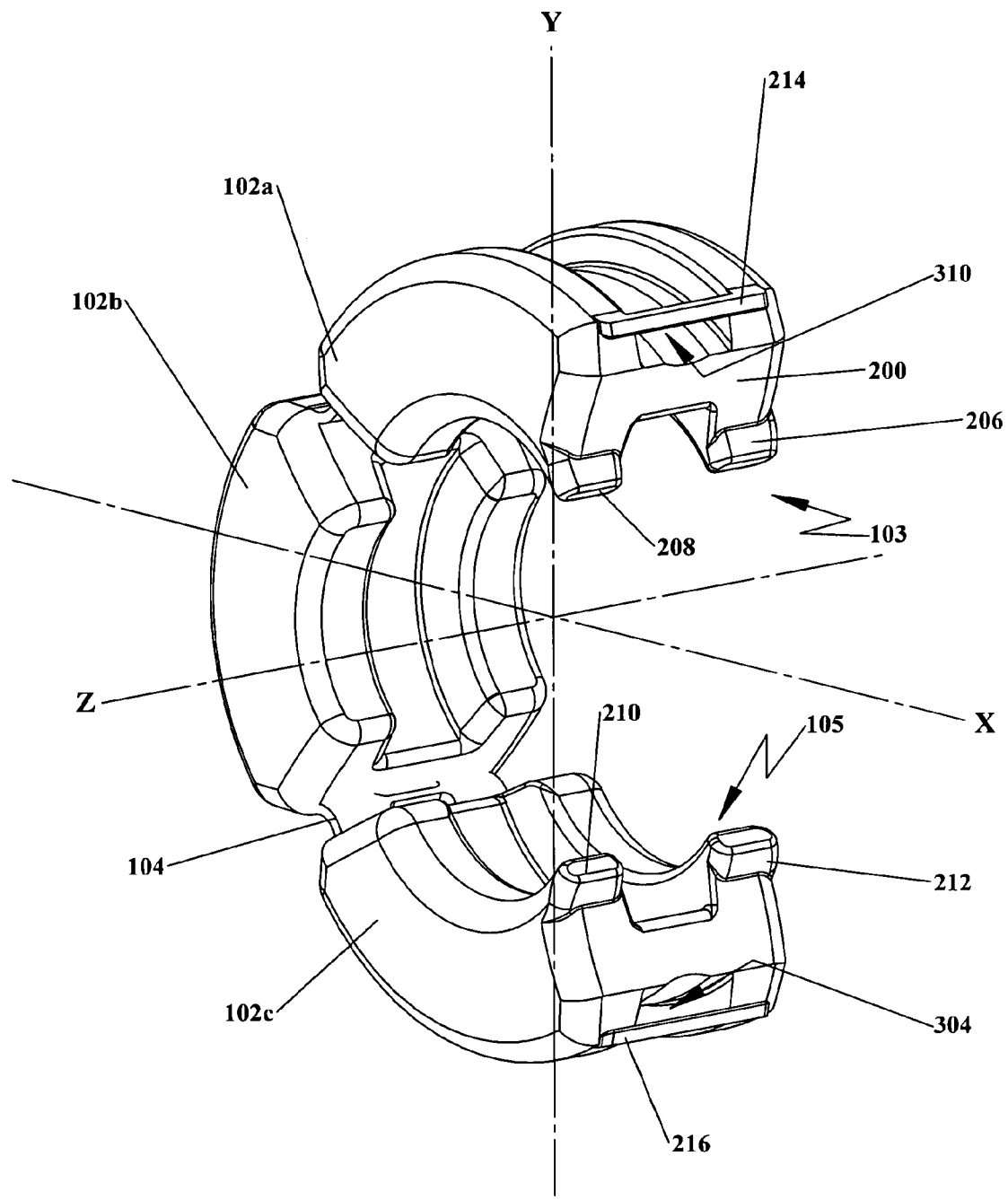
FIG. 5 is a perspective view of an embodiment of the present invention in the open configuration.

The hinges 104 have sufficient length and flexibility so as to allow for varying degrees of translational and rotational movement about and along the three primary axes: X, Y, and Z, as shown in FIG. 5. The hinges 104 are designed much thinner than the base 200 to allow for some flexibility to allow the clamp segments 102a, 102b, 102c to articulate in a radial or axial direction through rotational movement at the hinge 104. The length of the hinge 104 may also be configured to allow adjacent clamp segments 102a, 102b, 102c to articulate in a radial direction through translational movement relative to each other. The width of the hinge 104 may also be configured to be less than the width of the clamp segment 102a, 102b, 102c so as to allow for translational movement in the axial direction or rotational movement about the circumference or the center line 318 of the central groove 316. This versatility in clamp segment movement allows the clamping device 100 to compensate for irregularities in the fittings 10, 10' while maintaining even clamping force even under dynamic loads.

Due to the cost-effectiveness of manufacturing the clamping device, the clamping device 100 may be a one-time disposable clamp. However, the clamping device 100 can be reused if the user desires.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A clamping device, comprising:
   a. a plurality of clamp segments, each clamp segment, comprising:
      i. an arcuate base having an interior side and an exterior side,
      ii. a first pair of sidewalls extruding radially inward from the interior side of the arcuate base, thereby defining an interior channel, wherein the first pair of sidewalls are tapered nearest the base, wherein the sidewalls are conformable to a fitting inside the interior channel,
      iii. a second pair of sidewalls extruding radially outward from the exterior side of the arcuate base, thereby defining an exterior channel, wherein the exterior side of the arcuate base further comprises a pair of lateral ledges defining a central groove,
      iv. wherein each clamp segment is integrally interconnected with at least one other clamp segment by a non-load bearing hinge, wherein the non-load bearing hinge has a length and a flexibility sufficient to allow for translational and rotational movement about and along the three primary axes,
      v. wherein a first clamp segment comprises a first free end, the first free end comprising a first pair of protuberances,
      vi. wherein a second clamp segment comprises a second free end, the second free end comprising a second pair of protuberances,
      vii. wherein the first and second pair of protuberances are abuttable to prevent over tightening of the clamping device in a closed position; and
   b. a cable tie comprising a first end and a second end, wherein the first end fastens to the second end, and wherein the cable tie is housed inside the exterior channel of each clamp segment and passed through a first cable guard at the first free end and a second cable guard at the second free end.

2. A clamping device, comprising:
   a. a plurality of clamp segments, each clamp segment, comprising:
      i. an arcuate base having an interior side and an exterior side,
      ii. a first pair of sidewalls extruding radially inward from the interior side of the arcuate base, thereby defining an interior channel, wherein the sidewalls are conformable to a fitting inside the interior channel,
      iii. a second pair of sidewalls extruding radially outward from the exterior side of the arcuate base, thereby defining an exterior channel,
      iv. wherein each clamp segment is interconnected with at least one other clamp segment by a hinge; and,
   b. a cable tie comprising a first end and a second end fastenable to the first end,
      wherein the cable tie is housed inside the exterior channel of each clamp segment and passed through a first cable guard at the first free end and a second cable guard at the second free end,
      wherein the exterior side of the arcuate base further comprises a pair of lateral ledges extending the length of the arcuate base, the lateral ledges defining a central groove having an axis of symmetry.

3. The clamping device of claim 2, wherein the first pair of sidewalls are tapered nearest the base.

4. The clamping device of claim 2, wherein each clamp segment is integrally connected with at least one other clamp segment so as to form a single clamping body.

5. The clamping device of claim 2, wherein the hinge is a non-load bearing hinge.

6. The clamping device of claim 5, wherein the hinge has a length and a flexibility sufficient to allow for translational and rotational movement about and along three primary axes.

7. The clamping device of claim 2, wherein a first clamp segment comprises a first free end, the first free end comprising a first pair of protuberances, wherein a second clamp segment comprises a second free end, the second free end comprising a second pair of protuberances, wherein the first and second pair of protuberances are abuttable to prevent over tightening of the clamping device in a closed position.

8. The clamping device of claim 2, wherein each clamp segment comprises a flexible thermoplastic.

9. A method of clamping a fitting, comprising:
   a. circumscribing a clamping device around a pair of fittings, the pair of fittings comprising flanged mating portions, the clamping device comprising:
      i. a clamping body comprising a plurality of clamp segments, each clamp segment comprising an interior side and an exterior side, wherein each clamp segment comprises a first pair of sidewalls extruding from the interior side to house the flanged mating portions, and
      ii. a cable tie to secure the clamping device around the pair of fittings;
   b. tightening the clamping device around the fitting with the cable tie;
   c. generating a radially inward compression upon the fitting; and
   d. generating an axially inward compression upon the flange of the fitting, wherein the fitting is clamped,
      wherein the axially inward compression is generated by bending the first pair of sidewalls axially inward by tightening the clamping device.

10. The method of claim 9, wherein each clamp segments comprises a pair of opposing lateral ledges defining a central groove therebetween, the central groove having a central line, wherein tightening of the clamping device generates a radially inward force on the pair of opposing lateral ledges causing a radially and axially inward rotation of the lateral ledges about the central line, thereby bending the first pair of sidewalls axially inward to generate the axially inward compression upon the flange of the fitting.

11. The method of claim 9, wherein overtightening is prevented by a pair of abutting protuberances on first and second free ends of first and second clamp segments, respectively.

12. The method of claim 9, wherein the clamping body is manufactured as a single, integral piece.

* * * * *